Aug. 18, 1959 W. MAJUSICK 2,900,206
STATIC LINE RELEASE
Filed July 25, 1956 2 Sheets-Sheet 1
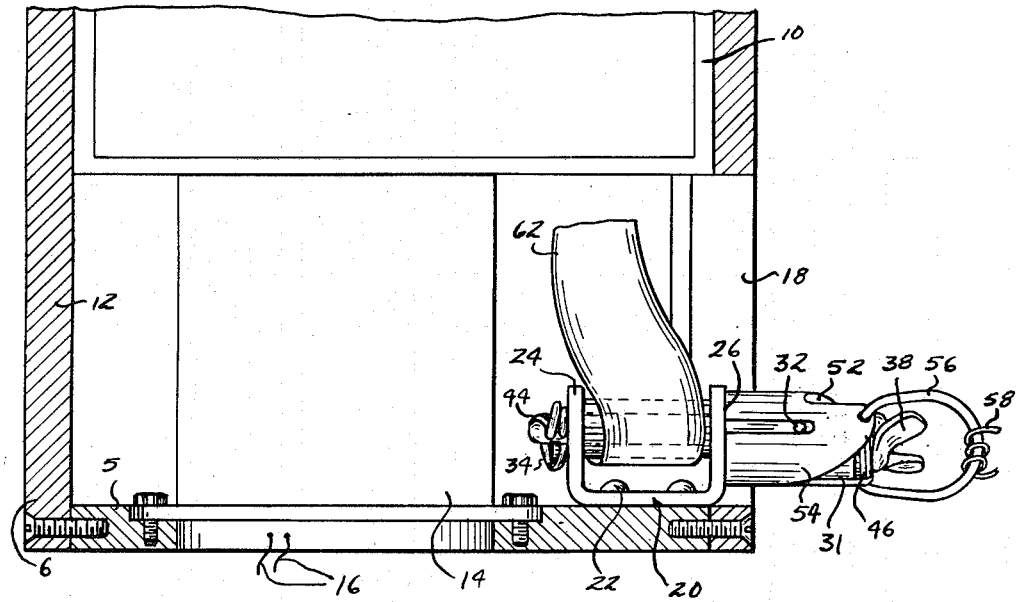
FIG. 1.
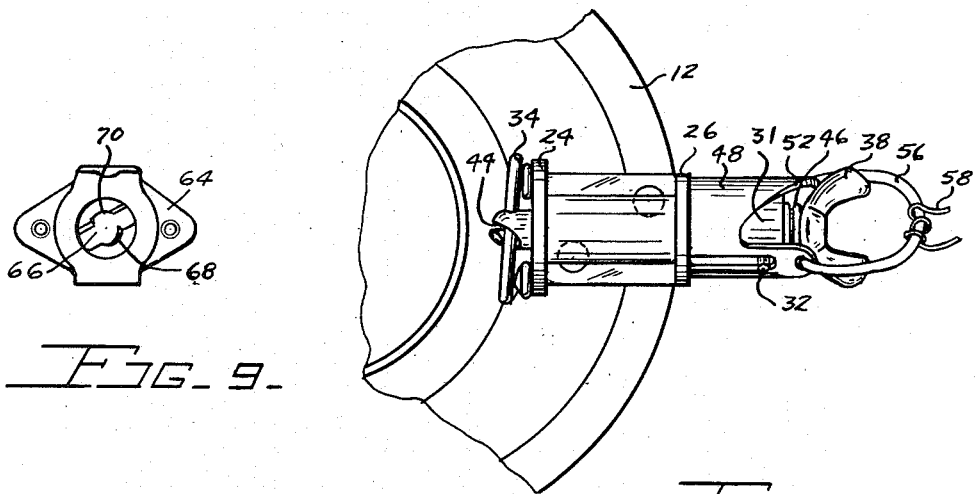
FIG. 9.
FIG. 2.
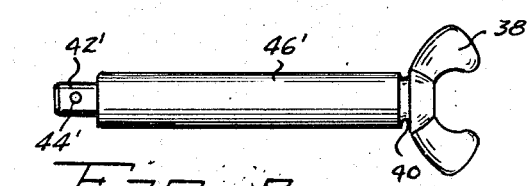
FIG. 8.
INVENTOR.
WALTER MAJUSICK
BY
AND
ATTORNEYS Aug. 18, 1959 W. MAJUSICK 2,900,206
STATIC LINE RELEASE
Filed July 25, 1956 2 Sheets-Sheet 2

INVENTOR.
WALTER MAJUSICK
BY
AND
ATTORNEYS

2,900,206
STATIC LINE RELEASE
Walter Majusick, Dayton, Ohio

Application July 25, 1956, Serial No. 600,148

8 Claims. (Cl. 294—83)

(Granted under Title 35, U.S. Code (1952), sec. 266)

The invention described herein may be manufactured and used by or for the United States Government for governmental purposes without payment to me of any royalty thereon.

This invention relates to releasing devices and, more particularly, to a device for the positive and instantaneous release of a static line. In certain sorts of test programs such as release of crash locator beacons or catapult ejector systems, a piece of equipment with an accompanying parachute is released from an aircraft by explosive means. While these systems are in the experimental stage and while repeated consecutive ejections are being rapidly made, it is necessary that means be provided which sever the static line from the aircraft instantly and from a remote point.

The object of the present invention is to provide a means for solving this problem, i.e., providing a device whereby the static line is released from the aircraft instantaneously, and which means is operable from a remote point such as the pilot's position in the cockpit.

A further object of the invention is the provision of a release means which is operable either by twisting motion or by a straight pull and is operable either on the spot or from a remote point.

A further object of the invention is the provision of means for releasing a static line from an aircraft which will be sturdy in construction and positive and absolutely sure in its operation.

In the drawings,

Figure 1 is a side elevation of the release device installed in an explosive ejector gun, the gun casing being shown partly in cross section.

Figure 2 is a top plan view of the device showing its installation in an explosive ejector gun.

Figs. 8 and 9 are detail views of a modified form of plunger rod, and plunger rod holding or locking means.

Figure 3:
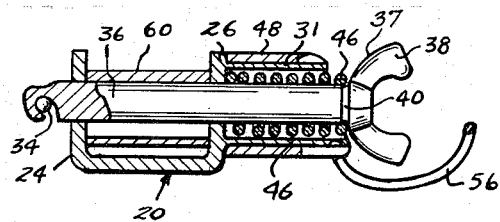
Figure 3 is a vertical cross section of the releasing device.

Referring more in detail to the drawings: One of the projects to which the invention can be applied is illustrated schematically in Fig. 1. A can 10, is a container for a crash locator beacon, a radio transmitter, photographic equipment, or any other material or equipment which it is desired to drop by parachute. These items are not shown in the drawing and do not constitute any part of the present invention. The can 10 is contained in a shell 12. The shell 12, secured to the aircraft, also contains an explosive ejector 14, operable by any means, such as an electrical impulse applied through wires 16. The ejector system also forms no part of the present invention. The container 10 is explosively ejected from the aircraft and descends by parachute. The parachute (not shown) is deployed or opened by means of its static line connection to the aircraft, and it is important as above stated, in certain testing procedures to release the static line from the aircraft, and this must be done at the proper instant, after the deployment of the parachute has been accomplished.

Figures 4, 5:
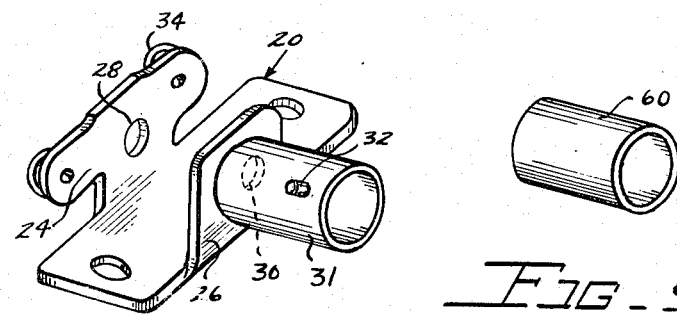
Figures 4, 5, 6 and 7 are details of the individual parts.
Figure 7:
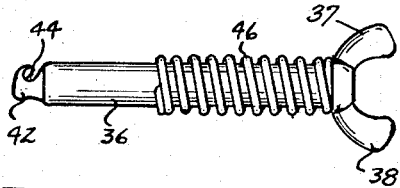

The shell 12 is provided with an opening 18. A bracket 20 is secured to the base of the shell 12 by any suitable means such as screws 22. The bracket is in general of a U-shape fromed with upstanding walls or arms indicated for designating purposes, as a forward wall 24 and a rear wall 26. The forward and rear walls are provided with aligned openings 28 and 30. The rear wall 26 is provided with a cylindrical portion 31 projecting normally thereto which portion is provided with a stop or key member 32. The forward wall has secured thereto on its outer side a plunger securing device 34, in the form of a spiral spring which constitutes one portion of a Dzus fastener. (See Aviation Magazine, February 1937, page 77.) This individual part of the assembly is shown alone in Figure 4. A plunger 36 is shown in detail in Figure 7. This plunger is provided at one end with a wing nut 38, and an annular groove 40, and on the other end with a reduced portion 42. The reduced portion 42 is provided with a spiral groove 44 which forms the complementary portion of the Dzus fastener mentioned above.

Figure 6:
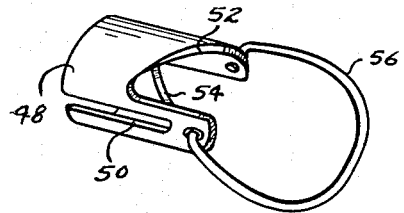

The annular groove 40 constitutes a seat and a holding device for the outer end of a spring 46. A sleeve member 48 is shown in detail in Figure 6. This sleeve is of such size as to slip over the cylindrical projection 31. A slot 50 in the sleeve member 48 slides over the key member 32. This key device allows axial movement of the sleeve on the member 31 and prevents relative rotating movement. The sleeve 48 is provided with cam surfaces 52 and 54 and a bail member 56. The operating means 58 is secured to the bail 56. This operating means may be in the form of a cord shown at 58 which can be extended to any remote position and operated by manual pulling, or by any other desired means.

When the device is to be assembled, a loop 62 of static line is secured in any manner around the sleeve 60. The sleeve 60 is inserted between the outer and inner walls of the bracket. When the release mechanism is to be set for trigger release, the cylinder 60 is placed within the loop 62 of the static line and held loosely between the walls 24 and 26 of the bracket. The cam sleeve is slipped over the cylindrical member 31, the slot 50 engaging the pin 32. The plunger 36 is then pushed through the cylinder 31, the cylinder 60, the openings 28 and 30, against the compression of the spring 46, and rotated until the spiral groove 44 and the spring engage and lock. The member 60 is a freely rotating sleeve which may or may not be used. Its function is the prevention of possible entanglement of the static line with the irregular portions of the plunger.

The release operation of the device is as follows: When the explosive ejector has been operated as by electrical impulse applied through wires 16, and the can 10 with its contents and with its parachute has been forcibly thrown from the plane, it is important that at the proper instant, the static line attached to the parachute be detached from the plane. This the operator does by jerking the cord 58, or by manually pulling on the bail 56 in an axial direction to the right as the device is shown in the drawing. This triggers the static line release mechanism. As before stated, the plunger 36 is released from the spring 34 shown in Fig. 2, or the bayonet slot shown in Fig. 9 by its own rotary motion. This rotory motion is accomplished by the axial movement of the camming sleeve 48. The engagement of the sleeves 48 and 31 is accomplished by a pin and slot connection, which allows axial sliding of the sleeve 48 on the sleeve 31. The sleeve 31 is fixed to the bracket 20. As the sleeve 48 moves to the right (as shown in the drawing) the camming surfaces 52 and 37 engage, causing the rotation of the plunger 36. As the plunger rotates, the spiral groove 44 is disengaged from the spring 34 or, as in the case of the modification shown in Fig. 8, the pin 44' is released from the bayonet slot 66. When this release takes place, the force of the spring 46, which has been compressed within the sleeve 31, expands suddenly, projecting the plunger forcibly to the right, and out of the space between the walls 24 and 26 of the bracket 20. The sleeve 60 falls away and with it the terminal loop of the static line 62 which has been confined by the plunger 36.

While the invention is shown and described in connection with one form for illustration, rather than restrictive purposes, it is obvious that minor changes and modifications may be made by those skilled in the art without departing from the scope and spirit of the invention as defined in the accompanying claims.

I claim:

1. Release means for a static line comprising a plunger insertable through a loop of a static line, a mounting for said plunger, means on said mounting for engaging one end of said plunger and operable by rotary movement of said plunger for locking and releasing said plunger into and out of static line holding position, said mounting including a cylindrical member, a sleeve, key means on said cylindrical member for allowing axial movement of said sleeve and preventing rotary movement thereof, means on said sleeve for applying axial movement to said sleeve, interengaging means on said sleeve and said plunger rotate said plunger and release it from locked position when axial movement is applied to said sleeve.

2. Release means for a static line comprising a plunger insertable through a loop of static line, a mounting for said plunger, means on said mounting for engaging one end of said plunger operable by rotary movement of said plunger for manually locking and releasing said plunger into and out of static line holding position, a sleeve on said mounting, interengaging key means on said sleeve and said mounting for allowing axial movement of said sleeve and preventing rotary movement thereof, means on said sleeve for applying axial movement to said sleeve, said means comprising a bail and a cord attached thereto operable by a pull from a remote point, interengaging cams on said sleeve and said plunger to rotate said plunger when axial movement is applied to said sleeve, compression means for freeing said plunger from said mounting, and freeing said static line when said plunger is released from said locking means.

3. A device for securing a static line to an aircraft and releasing it at a desired instant comprising, a bracket secured within the aircraft and provided with parallel spaced walls, a plunger capable of entering aligned openings in said walls, a sleeve, adapted to removably occupy a position between said arms and encircle said plunger to be freely rotatable thereon, said sleeve and said plunger adapted to be inserted through the terminal loop of a static line to secure said static line to the aircraft, means positioned on one of said walls for releasably engaging said plunger for securing the plunger in static loop holding position, means positioned on the other of said walls for releasing said plunger from said securing means and spring means operating on said plunger for forcibly withdrawing said plunger from the space between said walls thereby freeing said sleeve and static line from connection with said aircraft.

4. A device for securing a static line to an aircraft and releasing it at a desired instant comprising, a bracket secured within the aircraft and provided with parallel spaced walls, a plunger entering aligned openings in said walls, said plunger adapted to be inserted through the terminal loop of a static line to secure said static line to the aircraft, means positioned on one of said walls for engaging said plunger releasably securing the plunger in static loop holding position, means positioned on the other of said walls for releasing said plunger from securing means operating on said plunger and means for forcibly withdrawing said plunger from the space between said walls thereby freeing said static line from connection with said aircraft.

5. A release means for a static line comprising a plunger insertable through the terminal loop of a static line, a mounting for said plunger comprising a U-bracket secured to said aircraft and having spaced and parallel openings for receiving said plunger to occupy space between said walls, interengaging means on one of said walls and the end of said plunger for securing and releasing said plunger by rotary motion of said plunger, means on the other of said walls for imparting rotary motion to said plunger, said means comprising a cylindrical member rigid with said bracket, a cam sleeve encircling said cylindrical member and having axially slidable nonrotating relationship therewith, interengaging cam surfaces on said cam sleeve and said plunger whereby rotary motion is imparted to said plunger by axial movement of said cam sleeve to effect release of said plunger from said securing means when force is applied to said cam sleeve in an axial direction.

6. A static line release device comprising a bracket, parallel spaced walls on said bracket, said walls having aligned openings, a cylindrical member rigidly secured to one of said walls and coaxially located with reference to said openings, a camming sleeve encircling said cylindrical member and slidably and nonrotatably mounted thereon, a plunger member insertable axially through said cylindrical member and through the openings in said bracket wall, interengaging means on the exterior of the other of said walls and said plunger for securing said plunger upon rotary movement of said plunger in one direction, and releasing said plunger upon rotary movement of said plunger in the other direction, a compression spring seated at one end on said plunger and at its other end in said cylindrical member, interengaging camming means on said camming sleeve and said plunger for rotating said plunger, a bail on said camming sleeve for applying axially directed force to said camming sleeve.

7. In a release mechanism, a plunger, a bracket and a cam sleeve, spaced walls on said bracket having aligned openings for receiving said plunger, a spiral groove on one end of said plunger, means attached to one wall for engaging said spiral groove for locking said plunger in position, a cylindrical member rigidly secured on the other of said walls for slidably receiving said cam sleeve, means for preventing relative rotation of said cylindrical member and said cam sleeve, interengaging cam surfaces on said cam sleeve and said plunger, a compression spring, a seat for one end of said spring positioned within said cylindrical member, seating means for the other end of said spring on said plunger, means for imparting axial movement to said cam sleeve, whereby rotary movement is imparted to said plunger, releasing said plunger from locked position and forcefully ejecting it from the space between said walls.

8. A release means for a static line comprising a plunger insertable through a loop in the end of a static line, a mounting for said plunger, plunger securing means on said mounting, means on one end of said plunger for engaging said plunger securing means for locking said plunger in static line holding position, a cylindrical portion on said mounting, a cam sleeve on said cylindrical portion axially slidable with respect thereto, a camming surface on said plunger for engagement with said cam sleeve for applying rotary movement to said plunger to release said plunger from static line holding position when said cam sleeve is moved axially.

References Cited in the file of this patent

UNITED STATES PATENTS

| | | |
|---|---|---|
| 1,704,164 | Buckney | Mar. 5, 1929 |
| 1,908,146 | Helton | May 9, 1933 |
| 1,955,740 | Dzus | Apr. 24, 1934 |
| 2,054,519 | Dzus | Sept. 15, 1936 |
| 2,486,411 | Huelster | Nov. 1, 1949 |
| 2,580,666 | Dzus | Jan. 1, 1952 |
| 2,585,241 | Gunther | Feb. 12, 1952 |

OTHER REFERENCES

"Aviation" magazine page 77. February 1937.